United States Patent
Holland et al.

(10) Patent No.: US 7,441,254 B1
(45) Date of Patent: Oct. 21, 2008

(54) SIMULATION OF MEMORY-MAPPED I/O

(75) Inventors: Ian Michael Holland, Austin, TX (US);
Gareth Christopher Matthews, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 1826 days.

(21) Appl. No.: 08/890,643

(22) Filed: Jul. 9, 1997

(51) Int. Cl.
*G06F 9/455* (2006.01)
*G06F 9/54* (2006.01)
*G06F 17/30* (2006.01)

(52) U.S. Cl. .................... 719/332; 707/104.1; 717/106; 717/108

(58) Field of Classification Search ............. 707/1–205; 719/332; 717/106, 108
See application file for complete search history.

(56) References Cited

U.S. PATENT DOCUMENTS

| | | | |
|---|---|---|---|
| 4,719,593 A | 1/1988 | Threewitt et al. | 364/900 |
| 4,951,195 A * | 8/1990 | Fogg et al. | 364/200 |
| 4,974,191 A | 11/1990 | Amirghodsi et al. | 364/900 |
| 5,167,023 A * | 11/1992 | De Nicolas et al. | 395/527 |
| 5,237,669 A | 8/1993 | Spear et al. | 395/400 |
| 5,301,302 A * | 4/1994 | Blackard et al. | 395/500 |
| 5,339,426 A | 8/1994 | Aoshima | 395/700 |
| 5,357,604 A | 10/1994 | San et al. | 395/162 |
| 5,408,665 A | 4/1995 | Fitzgerald | 395/700 |
| 5,428,782 A | 6/1995 | White | 395/650 |
| 5,440,710 A * | 8/1995 | Richter et al. | 395/417 |
| 5,524,202 A * | 6/1996 | Yokohama | 707/104.1 |
| 5,548,759 A * | 8/1996 | Lipe | 707/100 |
| 5,603,014 A | 2/1997 | Woodring et al. | 395/500 |
| 5,604,843 A | 2/1997 | Shaw et al. | 395/101 |
| 5,802,554 A * | 9/1998 | Caceres et al. | 711/103 |

* cited by examiner

*Primary Examiner*—Li B Zhen
(74) *Attorney, Agent, or Firm*—Matthew Talpis Winstead, P.C.

(57) ABSTRACT

A converter program creates a simulated executable portion of code so that the operating system loader believes that a read only file stored on a hard drive of data consists of executable code and thereby memory-maps the read only file into virtual memory from storage. The result is that a large database may be memory-mapped into the processor virtual memory instead of the file having to be opened using standard file application program interface operations.

18 Claims, 6 Drawing Sheets

SIMULATION OF MEMORY-MAPPED I/O

TECHNICAL FIELD

The present invention relates in general to data processing systems, and in particular, to the loading of data from storage to processor memory.

BACKGROUND INFORMATION

Memory-mapped I/O provides advantages in speed of operation of operating system software for loading of data or code from main storage into computer memory (RAM). A problem occurs since some operating systems do not support a memory-mapped file I/O architecture. Certain users of these operating systems have large read only (R/O) files, e.g., databases that have to be read into memory in order to be processed and are immediately paged back out to a paging file or partition by the operating system. This is very slow and requires a considerable amount of disk space.

A solution to this problem would be to have a true memory-mapped I/O file system, but to implement this would require extensive development cost and time in order to re-program the operating system. Therefore, there is a need in the art for providing an ability for operating systems, which normally do not support memory-mapped I/O file architecture, to provide such a capability.

SUMMARY OF THE INVENTION

The present invention addresses the foregoing need by utilizing a loader that is used for shared libraries, e.g., dynamic link libraries (DLLs) to create memory-mapped I/O which would work on operating systems, that normally do not support memory-mapped file I/O architecture.

The present invention uses a converter program to create a simulated DLL (i.e. shared library), which the system loader then loads into the processor memory. This is accomplished by wrapping data with executable code to create a shared library. The system loader will now treat the data as if it were just another code segment. This means that the code is loaded when the virtual page is touched by the application. If the page gets old, then it would be discarded instead of being paged to the paging file. If the page is touched again, it will be re-read from the original file, like memory-mapped I/O.

It also has the benefits of performance because it is loaded through the page fault path in the kernel and not the file system API (application program interface) path.

In an alternative embodiment of the present invention, compression of the data can be utilized to enable the reading of the compressed data from the hard disk to be performed in a faster and more efficient manner.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
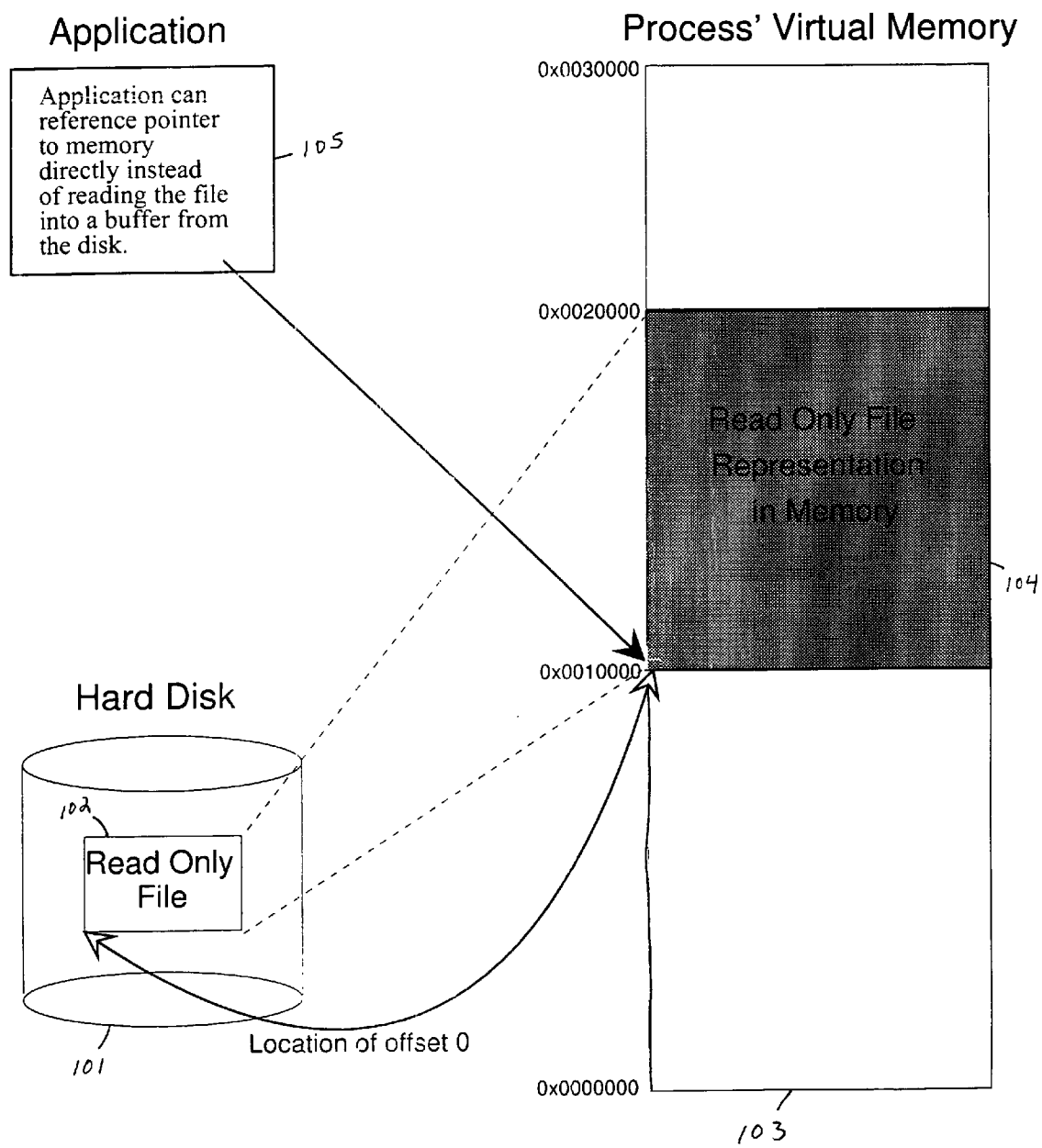
FIG. 1 illustrates a normal memory-mapped file layout.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Referring to FIG. 1, there is illustrated a process for a memory-mapped file operation. A read only file 102 is stored within a data processing system storage media, such as a hard disk 101. Memory-mapped I/O provides a memory representation of the read only file 102 within the virtual memory 103 associated with an application, which includes the RAM associated with the processor. The memory representation of the read only file 102 is represented as 104 within the virtual memory 103.

To create the representation in the memory 104, the operating file system determines how large is the read only file 102, then allocates a block size in the memory 103 for the number of pages that the read only file 102 is going to reside in. The software application 105 is then given a reference pointer to memory, which is in contrast to a standard file I/O API operation (see FIG. 4) whereby the operating system reads the file into a buffer from the hard disk 101.

The result of this process is that any modifications made to the read only file in memory 104 are reflected back onto the read only file 102 on the hard disk 101 (this is applicable only for read/write files). A page is faulted into the memory block 104 when the page is touched, or referenced. The operating system then reads the exact size for that page out of the file and maps it into the memory 104 at that location.

Not the whole read only file 102 is mapped into the memory block 104 immediately. Instead, there is a range of addresses that are reserved within the virtual memory 103 for the entire size of the read only file 102, but only a portion of the read only file 102 is placed into the memory block 104 at any time.

Figure 2:
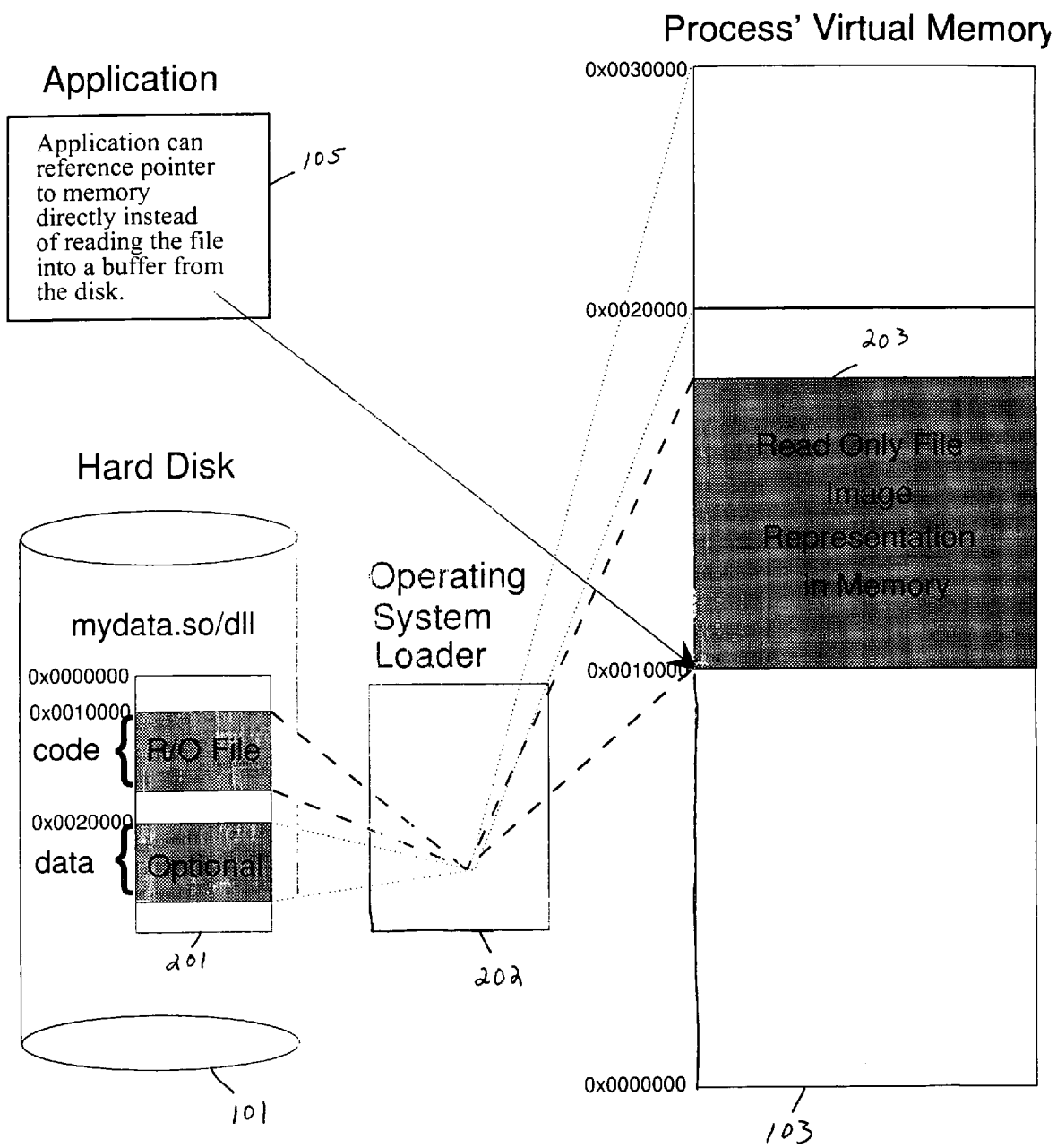
FIG. 2 illustrates memory-mapping via a system loader.
Figure 3:
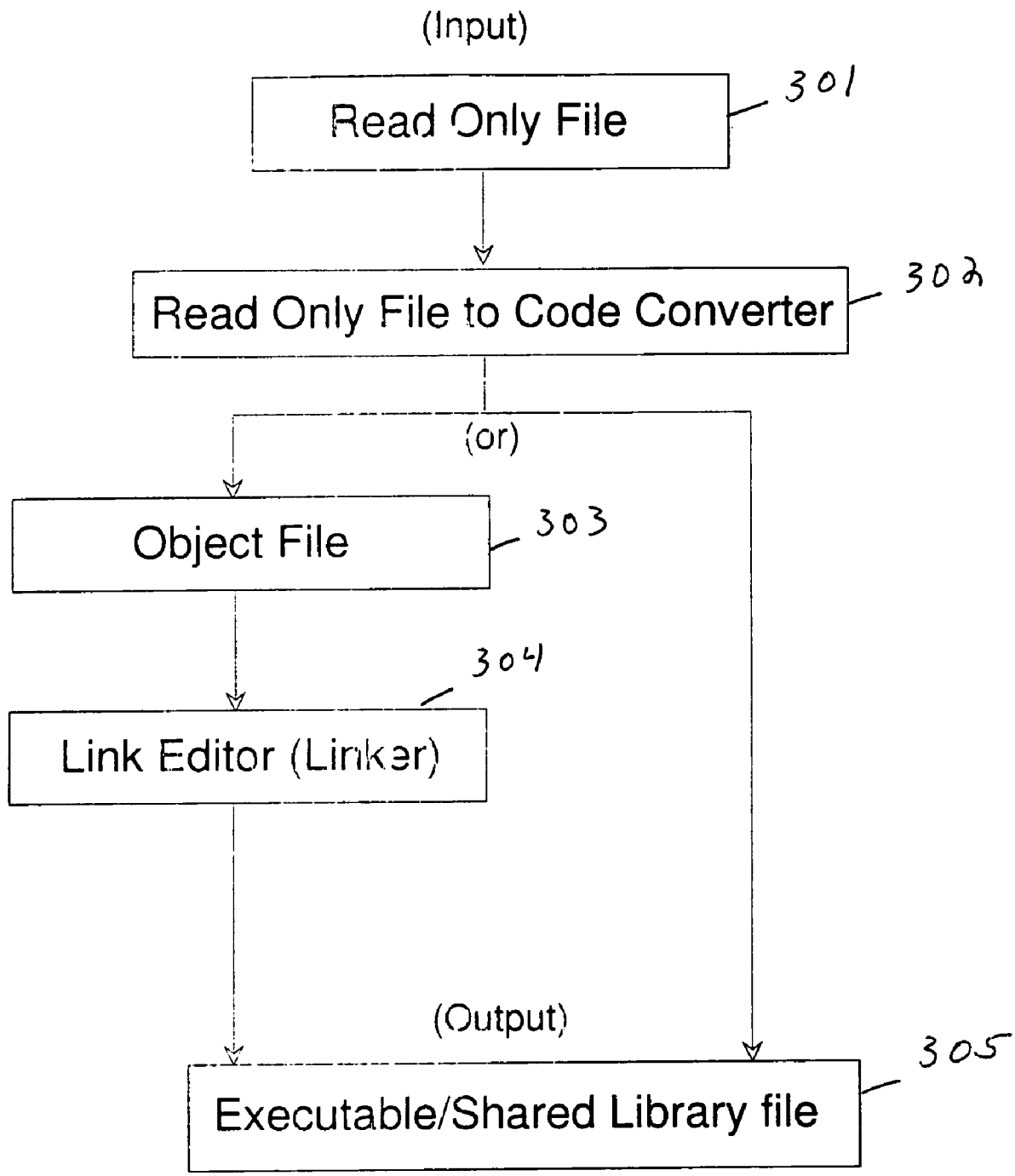
FIG. 3 illustrates read only data being converted to a memory-mapped file I/O.

Referring next to FIGS. 2 and 3, there is illustrated the process of the present invention whereby memory mapping is done via the system loader. What is desired is for a block of data, such as data within a database, to be memory-mapped into the virtual memory 103 as the representation in memory 203, so that the software application 105 can merely us a reference pointer to the memory 203 instead of reading a file into a buffer from the hard disk 101, which is a less efficient method especially with very large data files.

In order to perform this process in certain operating systems, such as OS/2, Windows 3.X, etc., the data needs to be converted into an executable file, represented in FIG. 2 as mydata.so/dll 201. Executable files generally include code and accompanying data. In this case, the data portion is optional. The process is performed by taking a read only file 301 and putting it through a code converter 302, which is a tool that wrappers the read only data with code headers and records in order to make the operating system loader 202 believe that the read only file is executable code. The system loader 202 then believes that the read only file is executable code and performs a memory-map operation to memory-map the read only file as the image representation in memory 203. The software application 105 is then given a reference pointer to the memory 203 in order to access the read only file.

The result of the foregoing operation is that the read only file is converted into an executable/shared library file 305, such as a DLL executable. The system loader 202 looks at the read only file as just another DLL and maps it right into memory 103. An option is for the R/O file to be passed through a tool in steps 303-304 that generates an object file and then generates an executable or shared libraries using the object file as an input into a link editor or generates the executable or shared library directly skipping the intermediate step.

The system loader 202 may be "fooled" into believing that the read only file on the hard disk 101 is executable code by the mere switching of a bit within a predesignated field. The system loader then just looks for the bit to determine whether or not the mydata.so/dll file is executable code or not.

The tool that performs the code conversion is one that can be programmed using the standard tools within the particular operating system platform. Such a tool can be found within the *Tool Interface Standards, Portable Format Specification Version*. 1.0, TIS Committee, February 1993 and other standard documents for specified platforms.

One of the advantages of using the memory-mapped I/O method is that it is faster than standard file I/O API operations. With the standard API operations, the file system has to call a consecutive series of APIs to the kernel, which usually has to perform several ring transitions which are very costly. So therefore, every time a file is opened, a ring transition is performed, and when a read is performed, another ring transition is performed.

Figure 4:
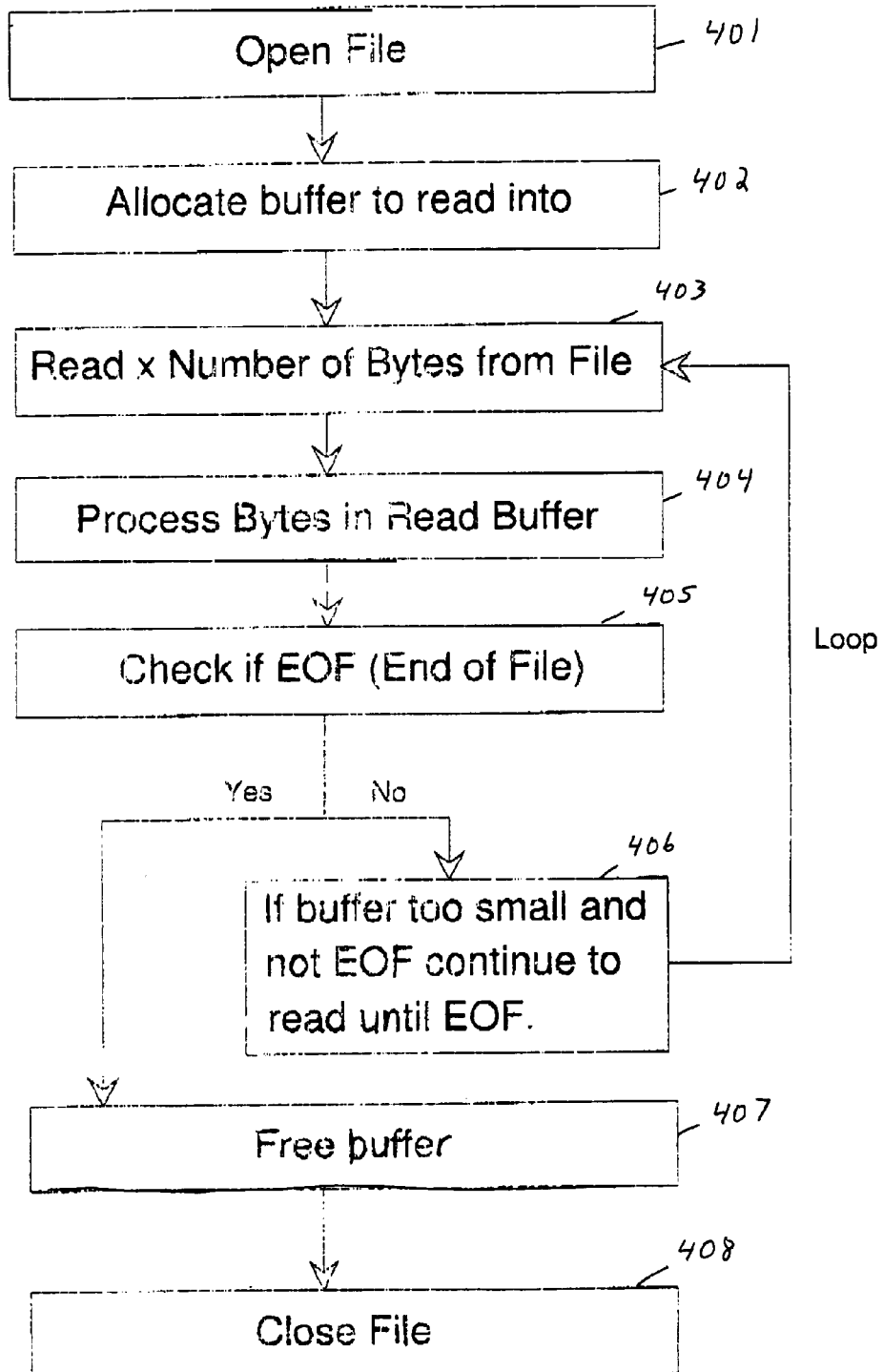
FIG. 4 illustrates a flow diagram of a standard file I/O API operation.

FIG. 4 illustrates the process for a standard file I/O API operation. In step 401, an application may open a file. The operating system loads the path name where the file is going to be and opens the file. On opening the file, there is no data in memory. Then in step 402, the operating system has to create a buffer to read the file into. This may be accomplished by some type of memory allocation routine from the kernel which provides a chunk of memory. Then, in step 403, an "x" number of bytes is read from the file into the buffer. In step 404, the bytes are processed in the read buffer. This is where the application uses the data it read from the file. In step 405, it is determined whether or not the end of the file has been reached. If not, then in step 406, if the buffer is too small and the end of the file has not been reached, then reads are performed until the end of the file and the process loops back to step 403. However, if the end of the file has been reached in step 405, then the process proceeds to step 407 to free the buffer and then close the file in step 408.

Figure 5:
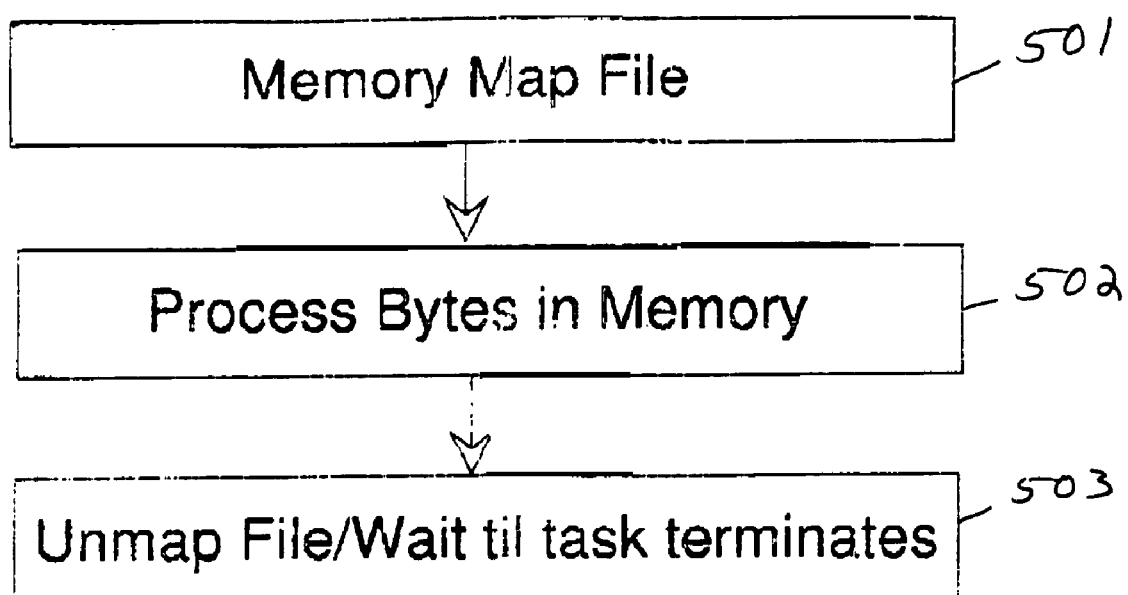
FIG. 5 illustrates a flow diagram of a memory-mapped I/O operation.

In contrast, FIG. 5 illustrates a memory-mapped I/O operation. In step 501, a file is memory-mapped. In step 502, the bytes are processed within the memory 103 by merely referencing a pointer to the memory that was returned in the initial map call. And the in step 503, the memory-mapped data will be freed up by calling the appropriate unmap API, or it will automatically be freed when the application is terminated by the user. With the memory-mapped I/O, a memory-mapped API is called and the application is returned a pointer that points to a portion of the memory representation. As a result, it could be easily seen that the process illustrated in FIG. 5 is much simpler, and faster than the process illustrated in FIG. 4. All that is needed with the memory-mapped I/O process for the application to read the data is to de-reference that memory and point to that memory location and the information is then provided. This is performed automatically by the operating system loading semantics.

Figure 6:
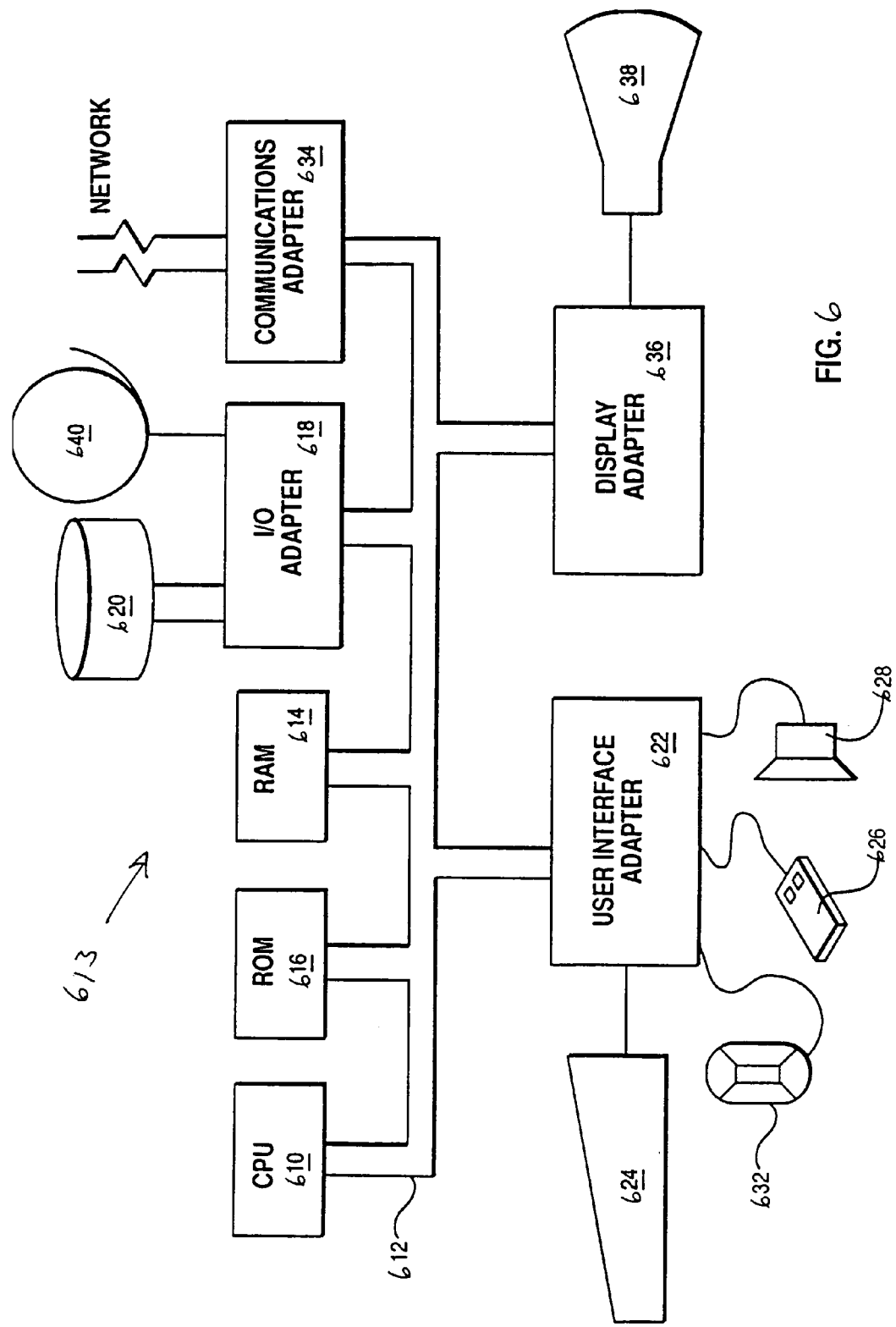
FIG. 6 illustrates a data processing system configured in accordance with the present invention.

A representative hardware environment for practicing the present invention is depicted in FIG. 6, which illustrates a typical hardware configuration of workstation 613 in accordance with the subject invention having central processing unit (CPU) 610, such as a conventional microprocessor, and a number of other units interconnected via system bus 612. Workstation 613 includes random access memory (RAM) 614, read only memory (ROM) 616, and input/output (I/O) adapter 618 for connecting peripheral devices such as disk units 620 and tape drives 640 to bus 612, user interface adapter 622 for connecting keyboard 624, mouse 626, speaker 628, microphone 632, and/or other user interface devices such as a touch screen device (not shown) to bus 612, communication adapter 634 for connecting workstation 613 to a data processing network, and display adapter 636 for connecting bus 612 to display device 638. CPU 610 may include other circuitry not shown herein, which will include circuitry commonly found within a microprocessor, e.g., execution unit, bus interface unit, arithmetic logic unit, etc. CPU 610 may also reside on a single integrated circuit.

Although the present invention and its advantages have been described in detail, it should be understood that various changes, substitutions and alterations can be made herein without departing from the spirit and scope of the invention as defined by the appended claims.

What is claimed is:

1. A method comprising the steps of:
   converting a read-only database file into a shared library with an executable code segment, wherein the shared library includes a reference pointer to data residing in the executable code segment;
   loading at least a portion of the converted read-only database file into a main memory by executing the shared library;
   obtaining said reference pointer by an application; and
   accessing said at least a portion of the converted read-only database file stored in the main memory based upon said reference pointer by the application.

2. The method as recited in claim 1, wherein the memory is virtual memory associated with the application running in a processor.

3. The method as recited in claim 2, wherein the converted read-only database file is memory-mapped from system storage by an operating system loader.

4. The method as recited in claim 3, wherein the converting step further comprises the step of wrapping the read only database file with executable code.

5. The method as recited in claim 4, wherein the wrapping step further comprises the step of wrapping the read only file with code headers and records in order to appear to an operating system loader as the executable code.

6. The method as recited in claim 2, wherein the processor operates in a protected mode.

7. A data processing system comprising:
- circuitry for converting a read-only database file into a shared library with an executable code segment, wherein the shared library includes a reference pointer to data residing in the executable code segment;
- circuitry for loading at least a portion of the converted read-only database file into a main memory by executing the shared library;
- circuitry for obtaining said reference pointer by an application; and
- circuitry for accessing said at least a portion of the converted read-only database file stored in the main memory based upon said reference pointer by the application.

8. The data processing system as recited in claim 7, wherein the memory is virtual memory associated with the application running in a processor.

9. The data processing system as recited in claim 7, wherein the converted read-only database file is memory-mapped from system storage by an operating system loader.

10. The data processing system as recited in claim 7, wherein the converting circuitry further comprises circuitry for wrapping the read only database file with executable code.

11. The data processing system as recited in claim 10, wherein the wrapping circuitry wraps the read only file with code headers and records in order to appear to an operating system loader as the executable code.

12. The data processing system as recited in claim 7 wherein the system includes a processor operating in a protected mode.

13. A computer program tool stored on a storage medium, comprising:
- program code for converting a read-only database file into a shared library with an executable code segment, wherein the shared library includes a reference pointer to data residing in the executable code segment;
- program code for loading at least a portion of the converted read-only database file into a main memory by executing the shared library;
- program code for obtaining said reference pointer by an application; and
- program code for accessing said at least a portion of the converted read-only database file stored in the main memory based upon said reference pointer by the application.

14. The computer program tool as recited in claim 13, wherein the memory is virtual memory associated with the application running in a processor.

15. The computer program tool as recited in claim 14, wherein the converted read-only database file is memory-mapped from system storage by an operating system loader.

16. The computer program tool as recited in claim 14, wherein the converting program code further comprises program code for wrapping the read only database file with executable code.

17. The computer program tool as recite in claim 16, wherein the program code for wrapping wraps the read only file with code headers and records in order to appear to an operating system loader as the executable code.

18. The computer program tool as recited in claim 14, wherein the processor operates in a protected mode.

* * * * *